United States Patent [19]

Lewis et al.

[11] 4,153,289
[45] May 8, 1979

[54] RAMP LEG GUARD

[75] Inventors: Mack A. Lewis; Don A. Greive, both of Sioux City, Iowa

[73] Assignee: Wilson Trailer Company, Sioux City, Iowa

[21] Appl. No.: 806,492

[22] Filed: Jun. 14, 1977

[51] Int. Cl.$^2$ ............................................. B62D 33/04
[52] U.S. Cl. ..................................... 296/24 C; 119/9
[58] Field of Search .............. 296/24 R, 24 C; 119/9, 119/82; 105/368 B

[56] References Cited

U.S. PATENT DOCUMENTS

| | | | |
|---|---|---|---|
| 2,970,861 | 2/1961 | Short | 296/24 C |
| 3,020,083 | 2/1962 | Doan | 296/24 C |
| 3,292,967 | 12/1966 | Peek | 296/24 R |
| 3,674,303 | 7/1972 | Doonan | 296/24 C |

*Primary Examiner*—Joseph F. Peters, Jr.
*Assistant Examiner*—John A. Carroll
*Attorney, Agent, or Firm*—Clarence A. O'Brien; Harvey B. Jacobson

[57] ABSTRACT

A ramp leg guard for use with livestock trailers and the like including panels which are automatically positioned and latched along at least one side of a ramp structure when said ramp structure is moved to an open position for loading or unloading of the trailer. In one embodiment a single panel is provided on each side of the ramp with said ramp being used with a trailer of drop-center, pull type. In another embodiment double panel structure is provided on only one side of the ramp with the other side of the ramp being enclosed by the side of the trailer. Both embodiments employ spring loaded hinges to automatically retract the guard panels and the ramp structure as well as latch mechanism for positively retaining the guard panels in tight engagement with the ramp structure in the extended position.

11 Claims, 12 Drawing Figures

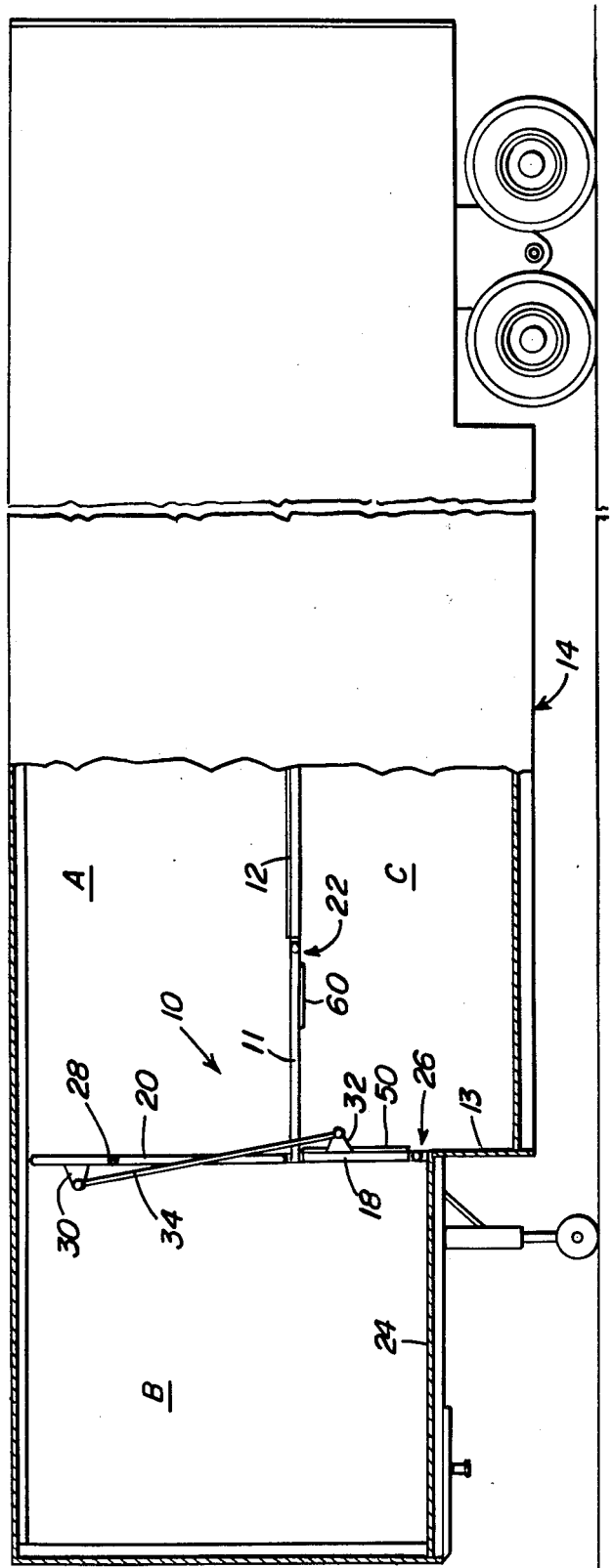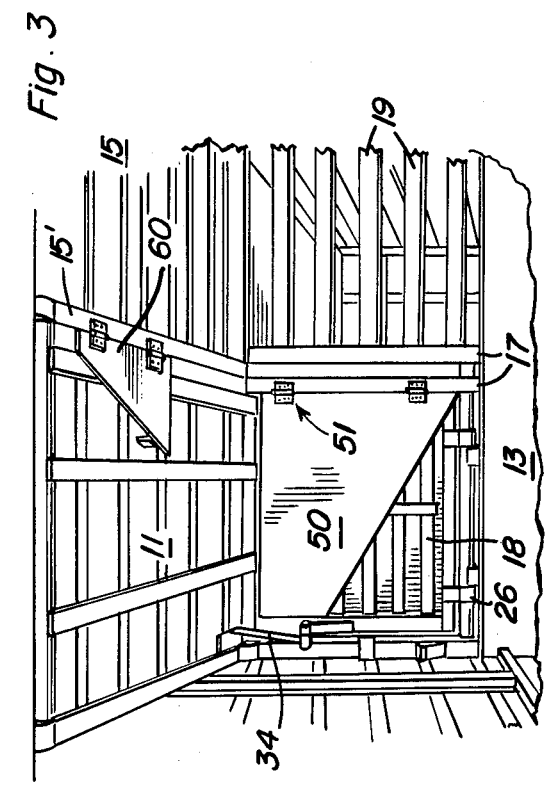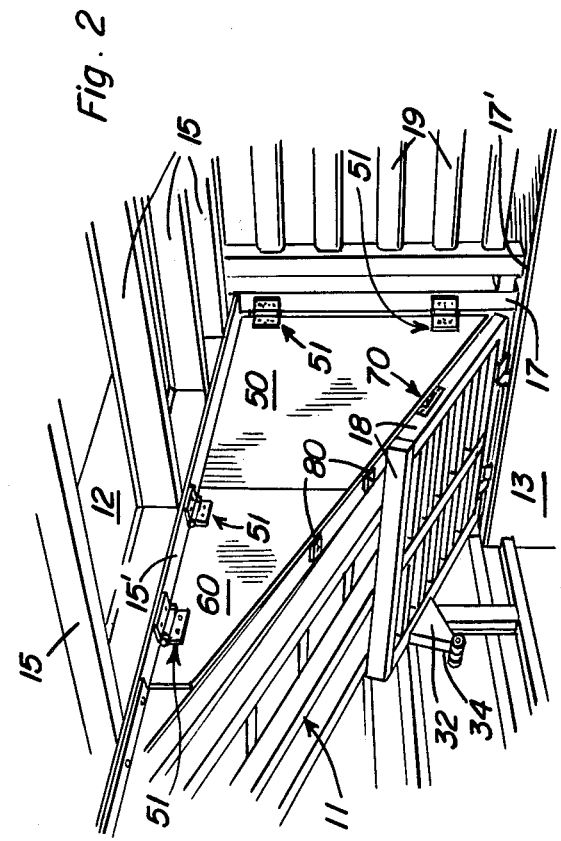

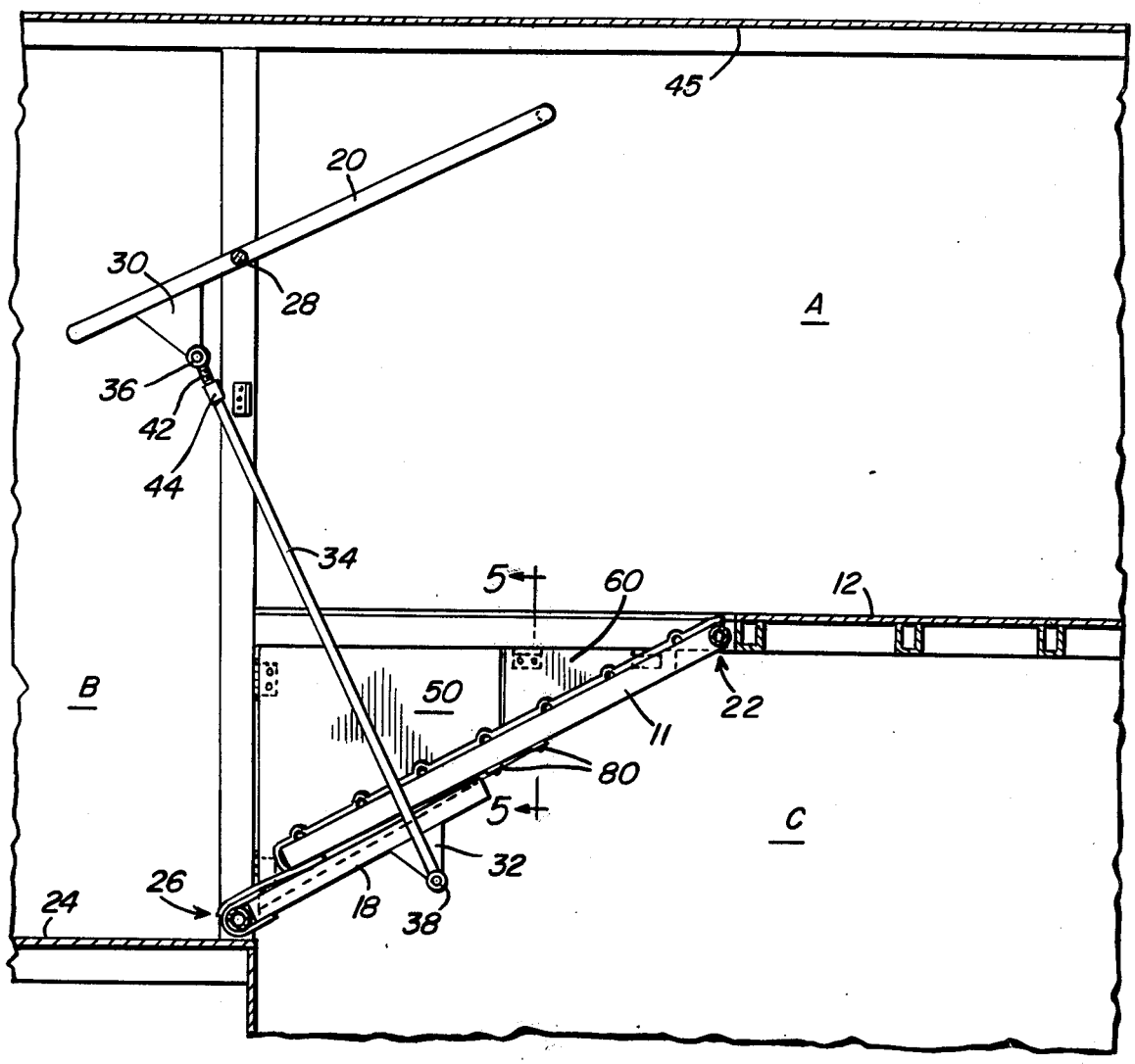
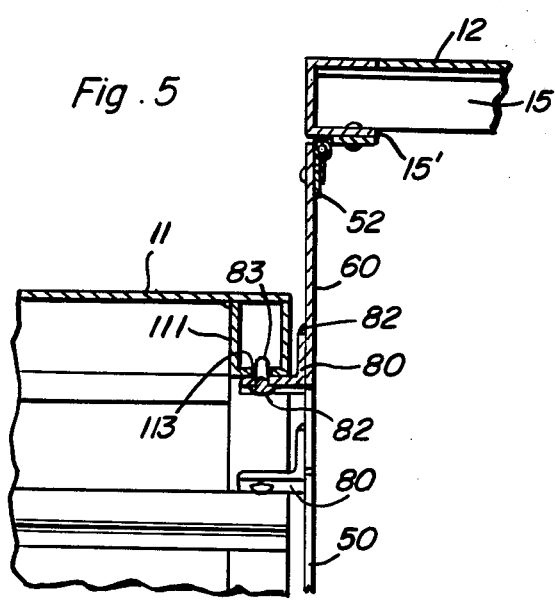
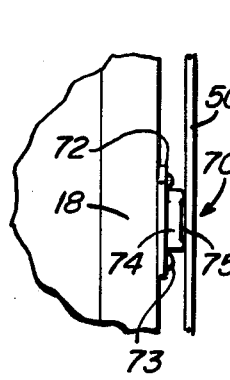
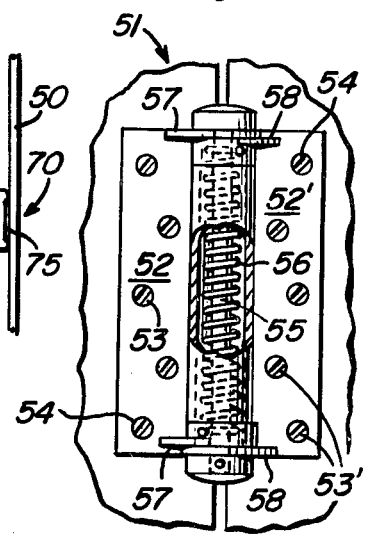

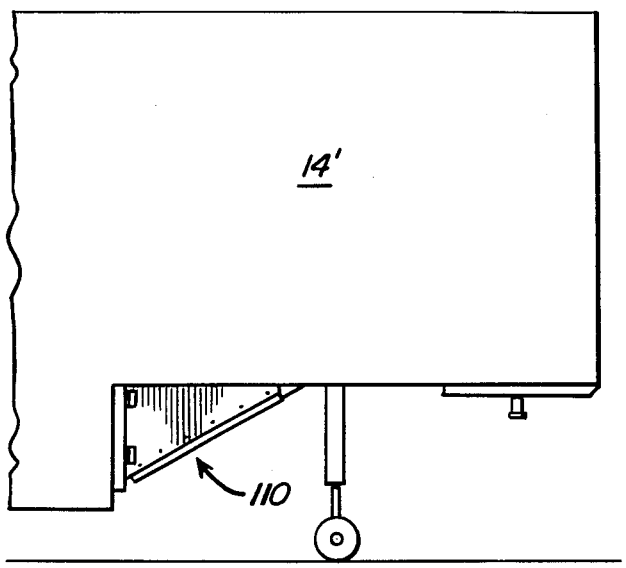
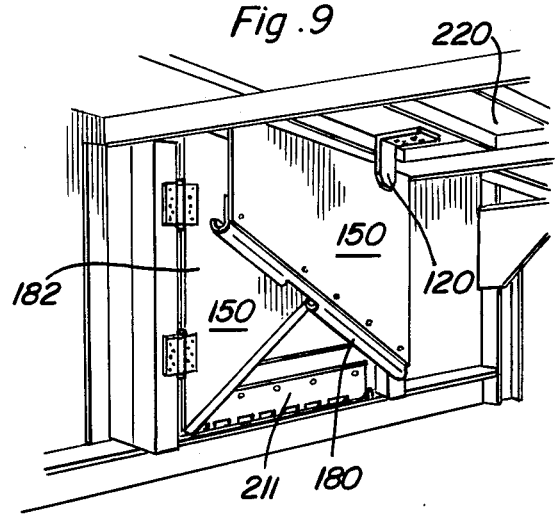
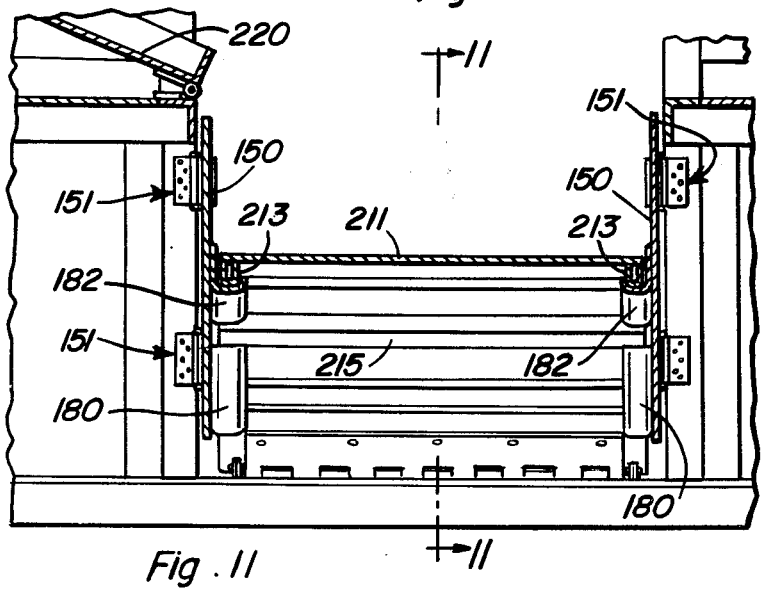
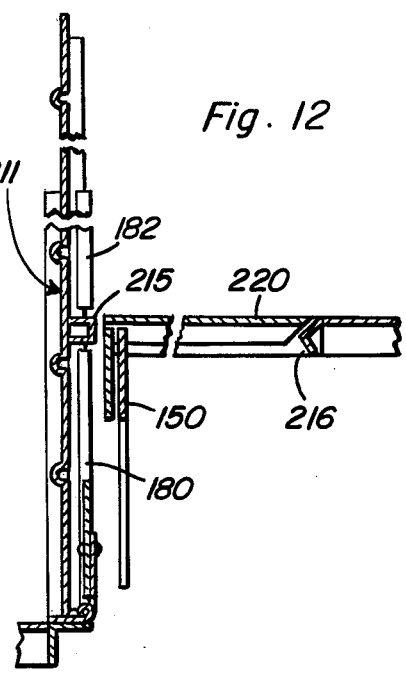
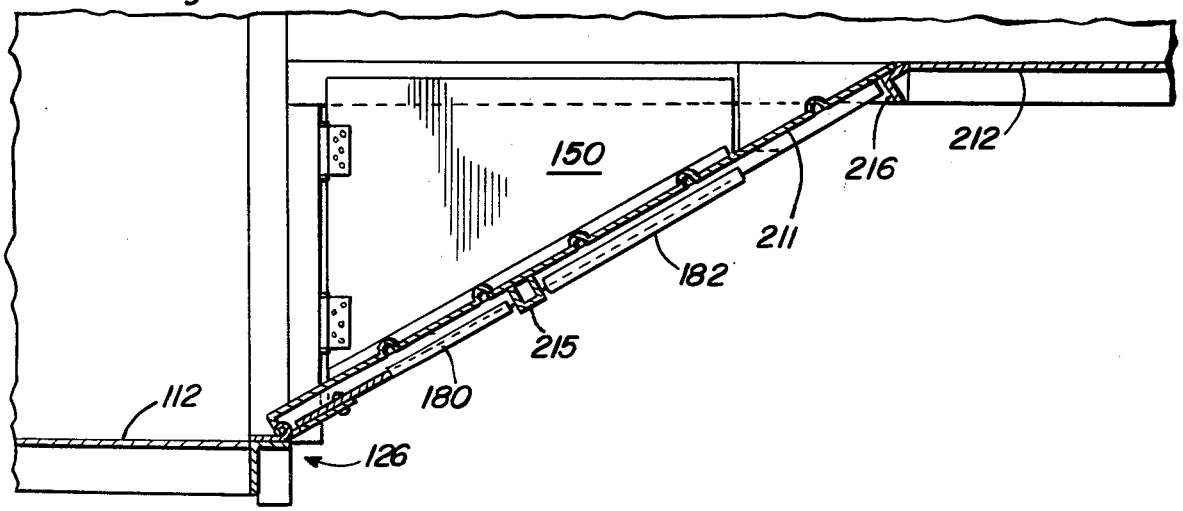

RAMP LEG GUARD

BACKGROUND OF THE INVENTION

1. Field of the Invention

This invention relates generally to ramp assemblies commonly provided in livestock trailers.

2. Description of the Prior Art

Normally livestock trailers are used for transporting large animals such as cattle as well as small animals such as hogs and sheep. In order to load and unload these trailers, gate and ramp structure is normally provided therewith. Such gate and ramp structure generally are of two types: one being of the full width of the trailer, and the other type being only a portion of the width of the trailer. When the gate and ramp device width is only a portion of the width of the trailer, a large opening exists to one or both sides of the ramp when the ramp is in the open position. This opening creates basically two problems: first, the livestock being loaded or unloaded through the ramp area may slip with the very undesirable result of a leg being caught in the opening, often ending up in a leg being broken; or secondly, the livestock being loaded or unloaded through the ramp passageway may try to crawl through the opening. This is especially true in the case of small animals such as hogs and sheep.

A problem with known type ramps with protective devices associated therewith for use with railroad shipping cars and the like is that the structure is arranged separate from the livestock confining structure and can be misplaced, inadvertently left behind, or more easily damaged than with structure which is permanently associated with the livestock transport structure.

Another problem with known type devices for use with livestock trailers is that the structure is unduly complicated, takes up a fair amount of space, and normally is not automatic or semi-automatic in operation and requires a great amount of manual effort to place in operative position.

Known prior art patents which may be pertinent to this invention are as follows:

U.S. Pat. Nos. 2,970,861 — Feb. 7, 1961
3,020,083 — Feb. 6, 1962
3,292,967 — Dec. 20, 1966
132,088 — Oct. 8, 1972
3,894,515 — July 15, 1975

None of these known prior art devices offers the new and unique features of the invention disclosed herein.

SUMMARY OF THE INVENTION

An object of the present invention is to provide a protective guard structure for use with ramp devices in livestock trailers.

Another object of the present invention is to provide a livestock leg protector structure in combination with ramp devices as normally used with livestock trailers which is automatically positioned and latched in place upon opening of the ramp structure to permit the loading or unloading of the livestock on the trailer.

A further object of this invention is to provide leg protector structure for livestock associated with trailer ramp structure which is automatically retracted when the ramp structure is moved from the loading/unloading position to the closed position with respect to the trailer with which it is used.

A still further object of this invention is to provide a gate and ramp device for livestock trailers in combination with a pair of guard panels which are automatically positioned and retracted along the open side of the ramp when the ramp is open for loading and unloading of animals on said trailer.

Another still further object of this invention is to provide a pair of leg guard panels mounted on both sides of a ramp as normally associated with a pull type drop-center livestock trailer for protecting animal legs when being loaded or unloaded by means of said ramp. An additional object is to provide latch mechanism for the leg guard protective panels which positively lock and retain same firmly against the ramp when in open position to prevent the livestock from opening or pushing the guard panels away from their protective position.

The ramp leg guard structure of this invention has a number of new and unique features. The structure will protect livestock and other animals, whether large or small, from injury and damage to themselves when they are being loaded or unloaded from the trailer structure in which they are normally transported. One embodiment is used where the ramp of the trailer takes up only a portion of the width of the trailer and when the ramp is in the open or livestock loading/unloading position presents a large opening on the side of the ramp near the center of the trailer. In this embodiment normally two adjacent panels are needed to completely occupy the triangular side of the ramp passageway to fully protect the livestock passing over the ramp. The other embodiment is used with trailers having ramps associated with drop-center pull type structure, and a pair of protective guard panels is used, one panel on either side of the ramp to close the side openings normally present on each side of the ramp passageway when the ramp is in the open loading/unloading position. Both embodiments have similar features of being automatically opened and closed in association with the ramp structure, as well as having spring loaded hinges, and panel to ramp latches for positively maintaining the protective guard panels engaged with the ramps when in the open position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a partially cut away side elevational view of a livestock trailer showing the double-deck, drop-center arrangement together with ramp and gate structure with which the device of this invention may be used.

FIG. 2 is a perspective view of the ramp structure together with the leg guard device of this invention in the open position.

FIG. 3 is a perspective view of the structure of FIG. 2 in the closed position.

FIG. 4 is a side elevational view, partly in cross-section, of the gate and ramp structure together with the leg guard structure of this invention in the open loading and unloading position.

FIG. 5 is a detail of the guard latch mechanism taken generally along line 5—5 of FIG. 4.

FIG. 6 is a detail of the ramp to panel opener.

FIG. 7 is a detailed view of the guard panel hinge and spring mechanism.

FIG. 8 is a side elevational view of another embodiment of this invention as applied to a drop-center pull type livestock trailer.

FIG. 9 is internal perspective view of this embodiment in the closed position.

FIG. 10 is a front section view of same in the unloading position.

FIG. 11 is a side section view taken substantially through a plane indicated by section line 11—11 in FIG. 10.

FIG. 12 is a partial side section view similar to FIG. 11 but showing the embodiment in a closed position.

DESCRIPTION OF THE PREFERRED EMBODIMENTS

Referring to FIG. 1 of the drawings, reference numeral 10 indicates in general a gate and ramp structure of a livestock trailer 14 having an intermediate deck floor or platform 12. The lower gate 18 is shown as being pivotally connected to a floor 24 of a front compartment B of the trailer body 14 by pivot means 26. An upper gate 20 is pivotally connected to the sides of the trailer body, or other vertical support structure, by pivot means 28. A V-shaped bracket 30 is rigidly attached to the upper gate 20 and a similar bracket 32 is attached to the lower gate 18 on respective opposite sides and are interconnected in a movable arrangement by a rod 34.

Looking at FIG. 4, the foregoing gate structure may be seen in enlarged detail. The rod 34 is pivotally connected to the bracket 30 on the upper gate 20 by pivot means 36 and is similarly pivotally connected to the bracket 32 on the lower gate 18 by pivot means 38. Rod 34 also may be provided with an adjustable collar 44 and a threaded coupling end 42 in order to properly adjust the closing of gates 18 and 20 relative to each other. When the gates are in the closed position of FIG. 1, a ramp 11 is normally supported on the end opposite to pivotal connection 22 by resting upon the upper edge of gate 18. The weight of the upper gate 20 being centered below the pivot pins 28 normally will hold the gate structure in the closed vertical position once moved thereto.

As seen in FIG. 4, the lower end of the upper gate 20 has been swung rearwardly and upwardly about the pivot pins 28 to an inclined position with the formerly lower edge closer to the roof 45 and the lower gate 18 correspondingly swung rearwardly to an inclined position through the action of the connecting rod 34. The ramp 11 has been pivoted downwardly to an inclined operative position through the force of gravity and is shown as resting on the inclined lower gate 18 to form a ramp assembly therewith. The operation of swinging the upper gate 20 to this inclined position is a simple and easy operation which may be performed by a single employee without use of additional equipment. Now in this operative position bridging the compartments, livestock may walk between compartment A and compartment B over the ramp assembly formed by 11 and 18.

In the case of livestock trailers wherein the above described structure extends the full width of the trailer, that is from one side wall of the trailer to the other, the trailer walls themselves protect the livestock from injuring themselves as they walk up or down the ramp. However, in many arrangements the gate and ramp structure only takes up a portion of the width of the trailer, and in such cases, the ramp assembly 11, 18 forms a passageway intermediate the sides of the trailer.

The purpose of this invention is to automatically close the open lateral sides of the passageway to protect the livestock. Leg guard protective panels are therefore provided as seen in FIGS. 1 and 4, indicated by reference numerals 50 and 60. The panel mounting structure together with automatic opening and closing mechanism will now be described in detail by reference to the perspective views of FIGS. 2 and 3. FIG. 2 is a view of the ramp assembly 11, 18 in the operative position ready for the loading or unloading of livestock with the leg guard protective panels 50 and 60 open in protective locked positions in coplanar relation to each other. It is viewed basically from compartment C looking toward compartment B. The double-deck floor 12 may be seen at the top of FIG. 2 with horizontal structural supporting joists 15. The front wall portion 13 of compartment C has a vertical post 17 running to an overhead joist 15' for supporting some of the mechanism of this invention. Vertical post 17' supports one end of the horizontal separator members 19. Spring loaded hinges 51 support the larger leg guard 50 from the vertical member 17 for pivotable movement about a vertical axis. These hinges 51 may be seen in greater detail in the enlarged showing of FIG. 7.

FIG. 7 shows a plurality of apertures 53, 53' provided on each of the hinge sections 52, 52' for reception of locking screws or bolts 54 therethrough in a conventional manner. Rivets or other fastening means also may be used, or even welding if desired. A hinge pin 55 is appropriately mounted through flanges 57 on hinge member 52 and flanges 58 on hinge member 52'. While the hinge pin 55 permits hinged pivotable movement of members 52 and 52' relative to each other, a bias spring 56 is normally associated therewith to normally maintain the hinge in the position as shown in FIG. 7. As mounted for supporting the leg guard panel 50, the spring normally would be biasing panel 50 into the closed position as shown in FIGS. 1 and 3. In this closed position, the inner side of the panel would normally bear against the inner or lower side of lower gate 18. The bias of spring 56 is sufficient to retain panel 50 in this closed position until such time as it is desired to use the loading and unloading ramp 11. At such time, when the gates 20 and 18 are opened as described, the lower end of gate 18 moving to the position of FIG. 4, will push against the panel 50 and force same into the operative position closing the triangular sides of the passageway as shown in FIGS. 2 and 4.

A ramp to panel opener 70, seen in enlarged detail in FIG. 6, is mounted upon the inner edge of ramp 18, as best seen in FIG. 2. This ramp to panel opener structure basically consists of a plate member 72 having a projecting receptacle 74 mounted thereon and rivets or screws 73 fastening same to the outer edge of the gate 18. Mounted within the receptacle 74 is a replaceable piece of slippery material such as plastic (Teflon) or the like for forming a slidable point of contact between the ramp 18 and leg guard 50. While only one of these ramp to panel opener structures is shown in the drawings, as many of them as desired and at as many contact points as are deemed necessary are envisioned by this invention.

Mounted from the longitudinally extending overhead member 15' are two more spring biased hinges 51 for supporting the second small leg guard panel 60. This second smaller leg guard is best seen in the closed position of FIG. 3 wherein the hinges are biased similarly to the position shown in FIG. 7, while FIGS. 2 and 4 show the second leg guard panel as fully opened and ready for protection of the livestock to be loaded or unloaded. Ramp to panel opener devices, such as shown in FIG. 6, may be mounted on the inner edge of the ramp 11 in a manner already discussed, though such openers are not presently shown on the drawing.

Another important structure for both of the panels 50 and 60 is best seen in the cross-section of FIG. 5, wherein a latch structure is shown. This latch structure consists of an angle member 80 which is fastened to the lower inner side of each of the leg guard panels 50 and 60 by means of welding or the like. Suitably bolted or welded to the angle members 80 are projections 83 for engagement with appropriate apertures 113 on the lower outside support rail 111 for the ramp 11. Normally, one such latch structure for each of the panels 50 and 60 will be sufficient, but more may be provided if desired. As can perhaps best be visualized by viewing FIG. 2, when the projections 83 are locked into the apertures 113 of the ramp rails the panels 50 and 60 will be securely held to the ramp and thus until such time as the ramp structure is lifted to the closed position, the panel structure will not be movable out of fixed guard positions. Obviously, once the desired loading or unloading has transpired, and the ramp 11 is moved upwardly to its vertical retracted position and the gates 18 and 20 are closed, the respective panels 50 and 60 under the bias of their spring hinges 51 will automatically move toward the closed position as seen in FIG. 3.

Another embodiment of this invention will now be described with reference to FIGS. 8–12. A drop-center pull type trailer 14' as shown in FIG. 8 with the structure of this embodiment indicated in general by reference numeral 110. A pivotally mounted ramp structure 211 is suitably hinged 126 at one end of the trailer deck floor 112. A pair of leg guard panels 150 are provided with one being mounted on each side of the ramp opening for association with the ramp 211 in the lowered position thereof. Suitable spring biased hinges 151 similar to hinges 51 already described and shown in FIG. 7, bias these double leg guards to the closed position as best seen in FIG. 9. A depending stop 120 on a trap door 220 prevents inadvertent opening of the guard panels 150 until such time as the operator opens the trap door for loading or unloading thereof. Once the trap door 220 is raised, the stop 120 will be out of the way of the outermost panel 150 and permit opening thereof into the operative position as shown in FIG. 10. U-shaped flange channel members 180, 182 are provided along the lower edges of the respective guard panels 150. These channel members receive and hold the lower rails 213 of the ramp 211. This structure in fact functions similarly to the latch mechanism 82, 83, 113 of the FIG. 5 of the above embodiment. Once the rails 213 are firmly within the channels 180, 182 the leg guard panels 150 cannot be moved away from the ramp either inadvertently or intentionally. A horizontally mounted brace member 215 on the lower portion of ramp 211 fits within the gap between the U-shaped sections 180, and 182 and is a spacer between the ramp 211 and the trap door 220 as seen in FIG. 12.

The free end of the ramp 211 is supported by an angle element 216 on the edge of the platform 212 as seen in FIG. 11.

As can be easily visualized by looking at FIGS. 8–12 of the drawings of this embodiment, when the ramp 211 is in the operative position resting on angle element 216, the side panels 150 are firmly secured in place by latch structure 180, 182, 213 to close the triangular sides of the ramp passageway. After finishing the operation, the ramp 211 will be raised, at which time the latch structure for the side panels 150 will be disengaged and the spring bias action of the spring hinges 151 will force said panels to the closed position of FIG. 9. After the trap door 220 is closed, angle member 120 will latch the guard panels in closed position.

As can be readily visualized both of the above described embodiments will offer positive and complete protection to all types of animals and livestock being loaded and unloaded on trailers similar to those shown. The devices shown also may be readily adapted to practically any type of trailer hauling structure with slight modifications thereto.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a livestock trailer having two compartments respectively provided with floors at different vertical levels, and a ramp assembly pivotally connected to one of said floors for displacement between a retracted position blocking entry to one of the compartments and an operative position extending at an incline between the floors of said compartments to form a passageway therebetween; protective means for said passageway including at least one guard panel, and means hingedly mounting said panel for displacement between a closed position adjacent the ramp assembly in the retracted position and an extended position between the compartments laterally of the ramp assembly to enclose the passageway thereabove.

2. The combination of claim 1 including means for biasing the panel to the closed position.

3. The combination of claim 2 including means for releasably latching the panel to the ramp assembly in the operative position.

4. The combination of claim 3 wherein said hinged mounting means establishes a pivotal axis for the panel perpendicular to the pivotal axis of the ramp assembly.

5. The combination of claim 4 including stop means displaceably mounted by the other of the floors for preventing displacement of the panel to the extended position.

6. The combination of claim 5 wherein said panel in the extended position occupies a substantially triangular side of the passageway.

7. The combination of claim 4 including an additional panel hingedly connected to one of the floors for displacement into coplanar relation to the first-mentioned panel in the extended position thereof.

8. The combination of claim 1 wherein said panel in the extended position occupies a substantially triangular side of the passageway.

9. The combination of claim 1 including stop means displaceably mounted by the other of the floors for preventing displacement of the panel to the extended position.

10. In combination with a livestock trailer having two compartments respectively provided with floors at different vertical levels, and a ramp assembly pivotally connected to one of said floors for displacement between a retracted position blocking entry to one of the compartments and an operative position extending at an incline between the floors of said compartments to form a passageway therebetween; protective means for said passageway including at least one guard panel, means hingedly mounting said panel for displacement between a closed position adjacent the ramp assembly in the retracted position and an extended position between the compartments laterally of the ramp assembly to enclose the passageway thereabove, and an additional panel hingedly connected to one of the floors for displacement into coplanar relation to the first-mentioned panel in the extended position thereof.

11. In combination with a livestock trailer having adjacent compartments respectively provided with floors at different vertical levels, a retractible passageway between said compartments, comprising a ramp, means pivotally connecting the ramp to one of the floors for displacement between a retracted position and an inclined position bridging the floors, panel means pivotally mounted in operative relation to the ramp for laterally enclosing the passageway above the ramp in the inclined position thereof, and means biasing the panel means to a closed position yieldably holding the ramp in said retracted position.

* * * * *